United States Patent Office 2,946,245
Patented July 26, 1960

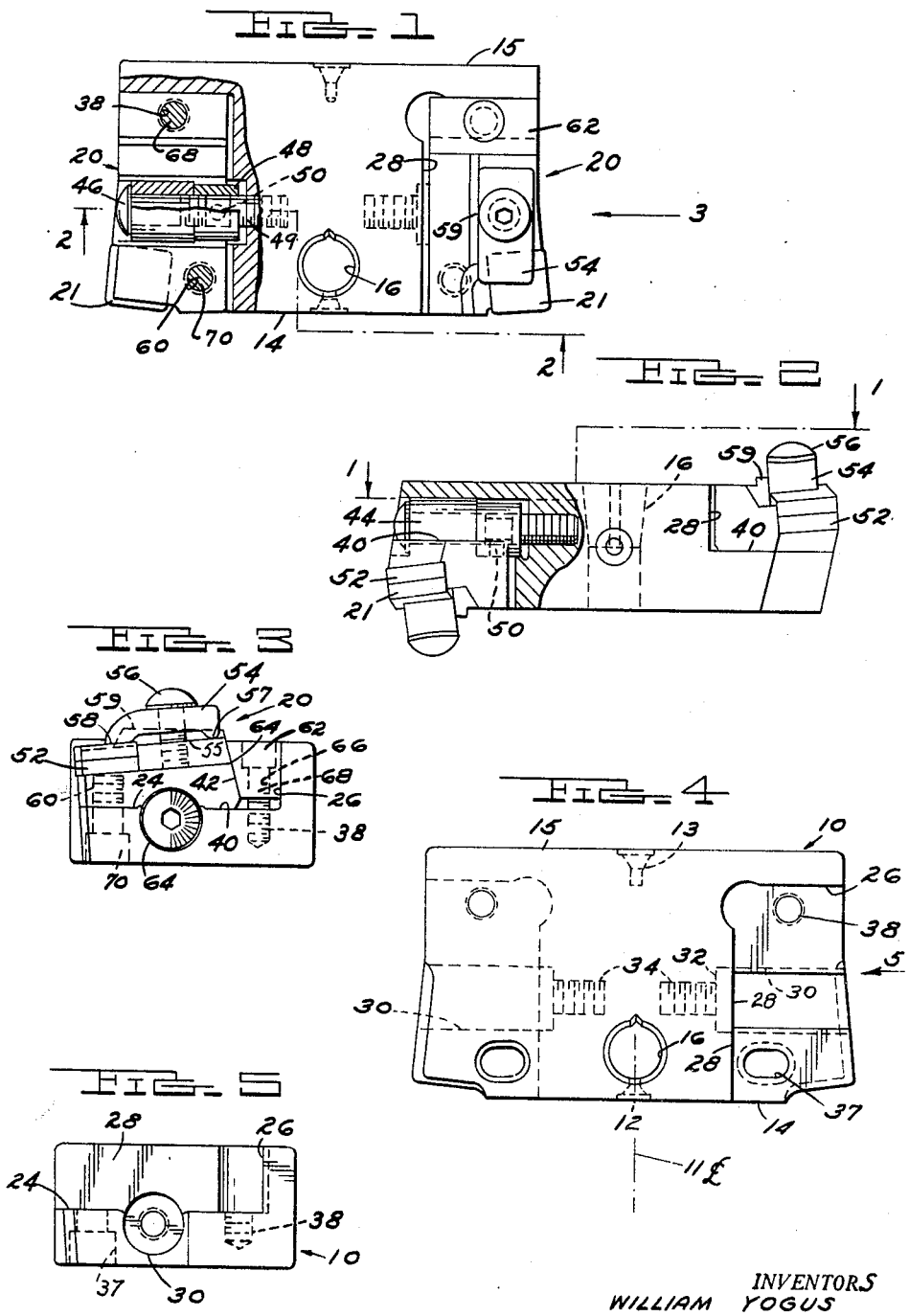

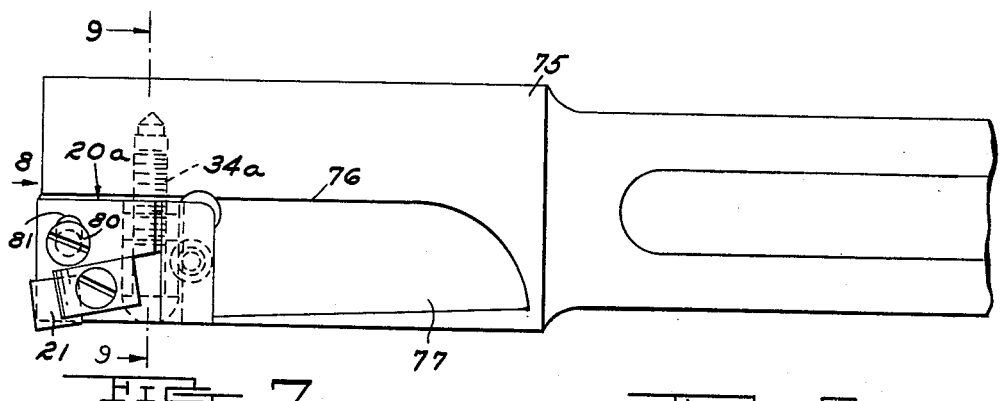

2,946,245

BORING TOOLS WITH INDIVIDUALLY ADJUSTABLE TOOL CARTRIDGES

William Yogus, Birmingham, and Frederick J. Cloutier, Detroit, Mich., assignors to The Valeron Corporation, Detroit, Mich., a corporation of Michigan Filed July 6, 1959, Ser. No. 825,169

8 Claims. (Cl. 77—58)

This invention relates to improvements in boring tools such as boring blocks and boring bars employing adjustable cutter carrying cartridges, including improvements in the construction and mounting of such cartridges.

These improvements provide for adjustment of the effective boring diameter of the tool by the use of a cutter carrying cartridge which is locked in adjusted position by means independent of the means employed to obtain adjusting movement; which is retained in assembled relation with the tool by the adjusting means when the locking means are loosened; which is suitable for the employment of the indexable throw-away type of cutter insert; and which is mounted on the tool so that all cutting forces imposed on the cutter insert are transmitted through the cartridge and directly therefrom to the tool body by surface to surface contact. The means for locking the cartridge insures such surface to surface contact and provides compensation for dimensional tolerances which arise during manufacture of the parts. The cartridge and its mounting in the tool are relatively simple to form and are suitable for multiple cartridge installations, particularly in tools such as a boring block.

The improved construction for mounting an individual tool cartridge comprises a mounting recess formed in the tool body, having a tool cartridge supporting surface which faces in the direction of rotation and a reaction surface which lies transverse to the axis of rotation and faces the direction of feeding movement. A guideway is formed in the recess below the cartridge supporting surface and on an axis which extends parallel to this surface and to the plane of the reaction surface. This guideway preferably has the shape of a major portion of a cylinder, the axis of which is located below the supporting surface a distance less than the radius of the cylinder. Each tool cartridge is dimensioned to fit one of the recesses and includes one side facing the reaction surface, a bottom face adapted to engage the supporting surface of the recess and a depending guide adapted to slidably engage the guideway. A tool bit is mounted on a portion of the cartridge oppositely disposed to the side thereof which faces the reaction surface. The construction further includes means engaging the cartridge guide and tool body for precisely adjusting the position of the cartridge longitudinally of the guideway or in other words transversely of the tool center line; and means are provided for releasably clamping the cartridge in adjusted position in abutment with the supporting and reaction surfaces of the recess, these clamping means preferably including a gib member engaging the reaction surface and the facing side of the tool cartridge, which is tapered to extend under a similarly tapered face of the gib. A clamping screw is employed to draw the gib member toward the supporting surface of the recess. This forces the gib into abutting contact with the recess reaction surface and facing side of the tool cartridge, clamps the tool cartridge against the supporting surface of the recess, and moves the cartridge in a direction transverse to the guideway to insure that there is no contact between that portion of the cartridge guide and guideway closest to the reaction surface.

An extremely rigid mounting of the cartridge is thus obtained. All forces imposed upon the cartridge by the cutting action of the tool bit are transmitted directly to two surfaces of the tool body—the supporting surface which faces in the direction of rotation and the reaction surface which faces in the direction of feeding movement. No force is transmitted through the cartridge guide to the tool guideway or to the adjusting means and hence there is no tendency to impair the precision adjustment built into these parts.

A further advantage of the construction is that during any adjustment of the cartridge the adjusting means then acts to hold the cartridge in assembled relation with the tool body.

Other features and advantages of the construction will be brought out in the following description of the presently preferred embodiments shown in the accompanying drawings where the invention is illustrated in its application to a boring block and a boring bar. These drawings comprise the following views:

Figure 1, a plan view of a boring block with a portion thereof being shown in section as indicated by a line 1—1 of Fig. 2;

Figure 2, a front or cutting end elevation of the boring block again with a portion thereof shown in section as indicated by the line 2—2 of Fig. 1;

Figure 3, a side elevation taken as indicated by the arrow 3 of Fig. 1;

Figure 4, a plan view of the boring block similar to Fig. 1 but with the tool cartridges removed;

Figure 5, a side elevation of the boring block shown in Fig. 4 taken as indicated by the arrow 5;

Figure 6, a plan view of a boring bar with a single cartridge installed therein;

Figure 7, a side elevation of the end portion of the bar and cartridge assembly of Fig. 6;

Figure 8, end elevation taken as indicated by the arrow 8 in Fig. 6; and

Figure 9, a sectional elevation taken as indicated on line 9—9 of Fig. 6.

Referring to Figures 4 and 5, the boring block body 10 is generally rectangular in shape both in plan and elevation and is symmetrical about a center line 11. When used with a boring bar for example, the block would conventionally be mounted in a rectangular slot in the bar conforming in dimension to the elevational view of the block shown in Fig. 5, and which slot lies along the axis of rotation of the bar. The block 10 would be mounted in this slot with its center line 11 aligned with the bar axis and would be positively locked in such position by suitable means, not shown, which engage the sockets 12 and 13 in the front and rear end faces 14 and 15 of the block and the hole 16.

The complete block assembly includes a pair of tool cartridges 20 each of which has a tool bit insert 21 of the indexable, throwaway type. These cartridges are mounted on opposite sides of the block center line 11 so that the tool bit 21 of each is located adjacent the front end face 14 of the block and facing the direction of rotation of the block which is counterclockwise as the assembly appears in Fig. 2.

The tool cartridges 20 are mounted in a pair of recesses formed on opposite sides of the block body. Each recess includes a supporting surface 24 which faces in the direction of rotation, a reaction surface 26 which faces in the direction of feeding movement, or towards the front end 14 of the block, and an inner surface 28. A guideway 30 lies below the supporting surface 24 and has the shape of the major portion of a cylinder whose axis extends parallel to the supporting surface 24 and to the plane of the reaction surface 26. The guideway 30 is formed by a boring operation before forming the supporting surface 24. The bore thus formed extends inwardly of the surface 28 at 32 and a threaded portion 34 of smaller diameter is formed concentric with the axis of the guideway. An elongated counterbored hole 37 is formed through the supporting surface 24 on one side of the guideway and a tapped hole 38 is provided in this surface 24 on the other side of the guideway adjacent the reaction surface 26.

Each tool cartridge is shaped to conform to the shape of the recess and has a bottom surface 40 adapted to engage the recess supporting surface 24 and a tapered surface 42 facing the recess reaction surface 26. A guide 44 depends from the bottom surface 40 and is bored to receive an adjusting screw 46. Screw 46 is rotatably mounted in the guide 44 and held in assembled relation therewith by a collar 48 which is mounted on the threaded portion 49 of the screw and held in proper position by a set screw 50.

Each cartridge is provided with a recess in which the tool bit 21 is mounted on a pad 52. In the construction shown, the tool bit 21 is of the throw-away type, having a plurality of cutting edges which may be used in succession, and the recess in which the bit 21 is mounted is formed so that any one of the cutting surfaces of the bit is positioned in proper relation to the center line of the boring block when the cartridge is installed thereon. A clamp 54 is mounted on the upper surface 55 of the cartridge by a screw 56, the clamp including a fulcrum surface 57 and a clamping surface 58 which engages the upper face of the tool bit when the screw 56 is tightened. A shoulder 59 is provided on the upper surface of the tool cartridge to properly establish the position of the clamp 54. A threaded hole 60 is formed into the bottom surface 40 of the cartridge and positioned for registry with the elongated hole 37 of the boring block recess.

A gib 62 is positioned between the recess reaction surface 26 and the inner tapered surface 42 of the tool cartridge and is formed with a tapered face 64 which is adapted to overlie and engage the similarly tapered face 42 of the cartridge. Gib 62 is provided with a counterbored hole 66 which, with some clearance, receives a cap screw 68. Cap screw 68 is engageable in the tapped hole 38 in the recess supporting surface 24.

Each cartridge is installed in its recess by threading the adjusting screw 46 into the threaded hole 34, placing the cartridge guide 44 in sliding relation with the guideway 30 and the cartridge bottom face 40 in sliding relation with the corresponding recess face 24. The threaded hole 60 of the cartridge is placed in some position of alignment with the elongated hole 37 of the body, a cap screw 70 is loosely installed together with the gib 62 and clamp screw 68, and the cartridge adjusted to a desired final position. Cap screw 70 and gib clamp screw 68 are then tightened to lock the cartridge in position.

It is obvious that in use, each cartridge is adjusted individually to obtain the desired cutting diameter and proper relative position or concentricity as between the tool bit of one cartridge and the tool bit of the other. When a tool bit is worn, it can be repositioned or replaced by merely loosening the clamp screw 56 while the position of the cartridge in the boring block remains unchanged.

Application of the invention to a boring bar follows identical principles as illustrated in Figures 6–9. To briefly describe this construction, a conventional bar 75 is machined to form a flute-like recess having a pair of right angularly disposed surfaces 76 and 77, surface 77 extending at an angle to the center line of the bar. In the construction shown, this angle defines one of the cutting angles of the tool bit 21. A cartridge mounting recess, having a supporting surface 24a and a reaction surface 26a, is formed in the flute-surface 76. A guideway 30a is formed below the reaction surface 24a in the manner previously described and a threaded hole 34a is also provided in the bar.

The cartridge construction is similar to that previously described and corresponding parts have been given the same reference number with the suffix a. Further description is considered unnecessary.

The means for locking the cartridge in adjusted position follow similar principles but a slightly different arrangement. These means include the screw 80 which engages a slotted hole 81 in the cartridge and a threaded hole in the boring bar and the gib 62a which is clamped in abutment with the cartridge side face 42a and the recessed reaction surface 26a by a screw 84 which extends loosely through a hole 85 in the bar and engages a threaded hole 86 in the gib.

The cartridge 20a is installed and adjusted in the same manner as has been previously set forth.

The following remarks apply equally to both of the constructions illustrated.

With either construction, when a cutting operation is performed, all forces imposed upon the cutting tool bit 21 are transmitted to the two faces 24 and 26 of the tool body. No forces are transmitted through the guide 44 and guideway 30. This is insured by the functioning of the gib 62. Actually this gib member 62 performs three functions—first, it forms a positive abutment between the reaction surface 26 of the recess and the facing side 42 of the tool cartridge, compensating for any dimensional tolerances; second, it acts to clamp the tool cartridge against the recess supporting surface 24; and third, it acts to move the cartridge transversely of the guideway 30 and take up any clearance between the guideway and the cartridge guide 44 so that the side portion of the guide closest to the reaction surface is in nonabutting relation with the corresponding portion of the guideway 30.

During adjustment of the cartridge, the positive interlock obtained by the more than semi-cylindrical shape of the guide and guideway, prevents any relative movement of the cartridge away from the surfaces 24 or 26 of the tool body.

When the cartridge has been set in the desired position, this setting is not affected when the clamping screws are tightened because the clamping action is transverse to the adjusting movement so that no stresses are produced which tend to effect the precision of adjustment.

While preferred embodiments have been described above in detail, it will be understood that numerous modifications might be resorted to without departing from the scope of the invention as defined in the following claims.

We claim:

1. In a boring tool of the type having a cutter carrying cartridge which is adjustable radially of the rotational axis of the tool, a tool cartridge mounting recess formed in said tool, said recess having a cartridge supporting surface facing in the direction of rotation and a reaction surface transverse thereto and facing the direction of feed, a guideway formed in said tool below said cartridge supporting surface, said guideway consisting of the major portion of a cylinder the axis of which is locetad below and parallel to said supporting surface a distance less than the radius of said cylinder, a tool cartridge having a side face facing said reaction surface, a bottom face adapted to engage said supporting surface and a depending guide adapted to slidably engage said guideway, means engaging said guide and tool for precisely adjusting the position of said cartridge longitudinally of said guideway, and means for releasably clamping said cartridge in adjusted position in said recess so that all cutting reaction forces are transmitted to said tool through the said supporting and reaction surfaces thereof.

2. A boring tool according to claim 1 wherein said cartridge clamping means include a gib member removably positioned between said reaction surface and said cartridge side face, said cartridge side face extending at an acute angle to said cartridge bottom face, said gib member having a face parallel to said cartridge side face and a second face parallel to said reaction surface, and means for drawing said gib member toward said supporting surface to place said gib faces in abutting relation with said cartridge side face and reaction surface and to position said cartridge so that the side portion of said guide closest to said reaction surface is in non-abutting relation with said guideway.

3. A boring tool according to claim 1 further characterized by said cartridge being provided with a recess for receiving a cutting bit insert, clamp means for locking said insert in said recess and means for securing said clamp means to said cartridge, said securing means being independent of said cartridge clamping means whereby said insert can be moved relative to its recess without affecting the position of said cartridge in said recess.

4. A boring tool according to claim 1 having a body with portions thereof extending transversely into either side of said rotational axis, one of said cartridge mounting recesses being formed in each of said extending portions and one of said cartridges being mounted in each of said recesses.

5. In a boring tool of the type having a cutter carrying cartridge which is adjustable radially of the rotational axis of the tool, a tool cartridge mounting recess formed in said tool, said recess having a cartridge supporting surface facing in the direction of rotation and a reaction surface transverse thereto and facing the direction of feed, a guideway formed in said tool below said cartridge supporting surface on an axis parallel to the plane of said reaction surface, a tool cartridge having a side face facing said reaction surface, a bottom face adapted to engage said supporting surface and a depending guide adapted to slidably engage said guideway, said guideway and guide being shaped to define relative movement between said cartridge and tool in a direction lengthwise of said guideway, means engaging said guide and tool for precisely adjusting the position of said cartridge longitudinally of said guideway, and means for releasably clamping said cartridge in adjusted position in said recess so that all cutting forces are transmitted to said block body through the said supporting and reaction surfaces thereof.

6. A boring tool according to claim 5 wherein said clamping means comprise threaded members engaging said tool in a direction perpendicular to said reaction surface and transverse to the direction of adjusting movement.

7. A boring tool according to claim 6 further characterized by said clamping means including a gib member engageable with said reaction surface and said cartridge side face, said cartridge side face extending at an acute angle to said cartridge bottom face, said clamping means including a threaded member for drawing said gib toward said supporting surface to position said gib in abutting contact with said cartridge side face and said reaction surface.

8. In a boring tool, a tool cartridge having a cutting bit mounted thereon, a tool cartridge recess formed in said boring tool inwardly of the cutting end and one side thereof, said recess having a cartridge supporting surface extending inwardly of said cutting end and a reaction surface extending perpendicular to said supporting surface, a slotted guideway formed in said tool below said supporting surface, said guideway extending parallel to said supporting and reaction surfaces and consisting of the major portion of a cylinder whose axis is located below said supporting surface a distance less than the radius of such cylinder, said tool cartridge having a side face directed toward said reaction surface and tapering outwardly therefrom, a bottom face adapted to engage said supporting surface and a depending guide adapted to slidably engage said guideway, adjusting means rotatably carried by said guide and threadedly engaging said tool for precisely adjusting the position of said cartridge longitudinally of said guideway and means for releasably clamping said cartridge against said supporting surface, said clamping means comprising a gib member having a tapered surface for engagement with said tapered cartridge side face and a second surface for engagement with said reaction surface, a threaded member engaging said gib and said tool and drawing said gib into abutment with said reaction surface and cartridge side face, a screw for fastening said cartridge to said tool at a location spaced from said gib toward the cutting end of said tool, and means for mounting said fastening screw such as to permit relative movement between said cartridge and tool longitudinally of said guideway and relative movement transversely of said guideway at least to the extent of a portion of the clearance between said guide and guideway.

References Cited in the file of this patent

UNITED STATES PATENTS

| | | |
|---|---|---|
| 1,306,185 | Kelley | June 10, 1919 |
| 2,382,911 | Pringle | Aug. 14, 1945 |
| 2,402,650 | Maffia | June 25, 1946 |
| 2,449,823 | Sheridan | Sept. 21, 1948 |